UNITED STATES PATENT OFFICE.

ORPHANA TAYLOR, OF CALEDONIA, OHIO.

MEDICAL COMPOUND FOR AGUE.

SPECIFICATION forming part of Letters Patent No. 231,120, dated August 10, 1880.

Application filed February 19, 1880.

*To all whom it may concern:*

Be it known that I, ORPHANA TAYLOR, of Caledonia, in the county of Marion and State of Ohio, have invented certain new and useful Improvements in Fever and Ague Medicine; and I do hereby declare that the following is a full, clear, and exact description of the invention, which will enable others skilled in the art to which it appertains to make and use the same.

My invention relates to an improvement in medicine for the cure of fever and ague.

In the preparation of my medicine I take five ounces of papaw-root, one and a half ounce of blackberry-root, four ounces of wild-plum root, four ounces of crab-apple root, two ounces of balm-of-gilead root, three-fourths of an ounce of yellow-root, one and a half ounce of hops, and three and a half ounces of alcohol. This I boil in sufficient water to form, when partially evaporated, one pint of an extract thereof.

In administering my medicine the dose is, for an adult, a tea-spoonful, to be taken every two hours until the fever or disease is broken.

What I claim, and desire to secure by Letters Patent, is—

The medical composition herein described for the treatment of fever and ague and kindred diseases, consisting of papaw-root, blackberry-root, wild-plum root, crab-apple root, balm-of-gilead root, yellow-root, hops, and alcohol, in the proportions specified.

In testimony that I claim the foregoing as my own I affix my signature in presence of two witnesses.

ORPHANA TAYLOR.

Witnesses:
S. H. RICE,
M. R. HARRISON.